US006230765B1

(12) United States Patent
Virginio et al.

(10) Patent No.: US 6,230,765 B1
(45) Date of Patent: May 15, 2001

(54) DISTRIBUTOR FOR THE DEPOSIT OF MELTED PRODUCTS IN THE INTERIOR OF CONTAINERS HAVING THE SAME OR DIFFERENT SHAPE AND SIZE

(75) Inventors: Domenico Virginio, Arzignano; Luca Virginio, Chiampo; Marco Virginio; Matteo Virginio, both of Arzignano, all of (IT)

(73) Assignee: Virgino Nastri S.r.l., Arzignano (IT)

( * ) Notice: Subject to any disclaimer, the term of this patent is extended or adjusted under 35 U.S.C. 154(b) by 0 days.

(21) Appl. No.: 09/468,413

(22) Filed: Dec. 20, 1999

(30) Foreign Application Priority Data

Dec. 21, 1998 (IT) .................................... VI98A0240

(51) Int. Cl.⁷ ...................................................... B65B 1/04
(52) U.S. Cl. .............................. 141/131; 141/284; 141/67
(58) Field of Search ..................................... 141/131, 231, 141/250, 284, 67

(56) References Cited

U.S. PATENT DOCUMENTS

| 4,465,150 | * | 8/1984 | Matsumoto | 141/244 |
| 4,947,903 | * | 8/1990 | Beckwith | 141/67 |
| 6,105,637 | * | 8/2000 | VerMehren | 141/248 |

* cited by examiner

*Primary Examiner*—Steven O. Douglas
(74) *Attorney, Agent, or Firm*—Buchnam and Archer

(57) ABSTRACT

A distributor for the deposit of melted products in the interior of containers having the same or different shape and size, suitable for being used in operations of continuous cycle and particularly in presswork operating with injection or blow of plastic materials is described and the opening (2) for unloading the products which must be deposited and also the containers for collection (3) of the same products are static and in addition there is an intermediate device capable of collecting continuously the products which are unloaded from the same opening to be deposited always continuously in the interior of the same containers.

6 Claims, 1 Drawing Sheet

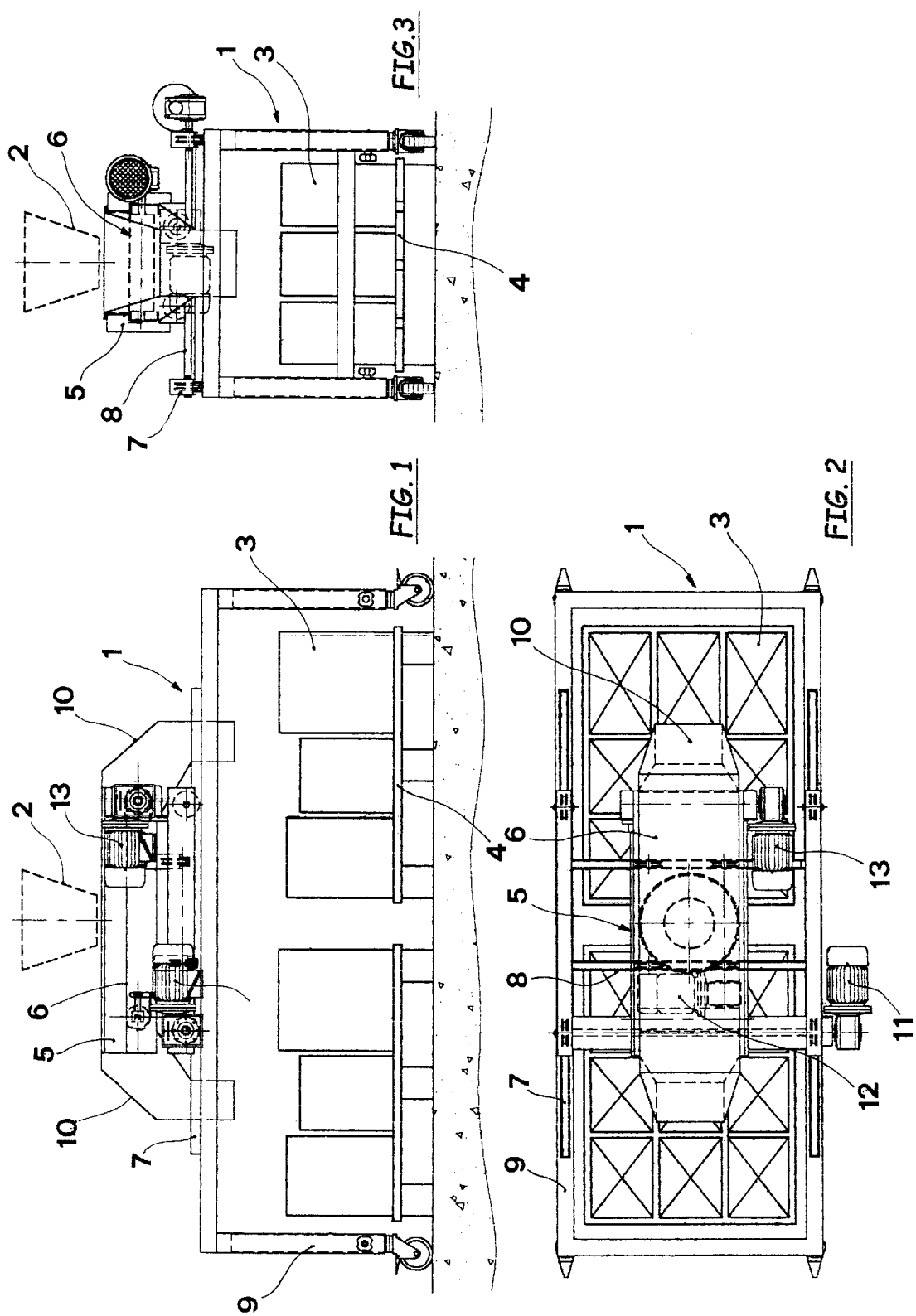

DISTRIBUTOR FOR THE DEPOSIT OF MELTED PRODUCTS IN THE INTERIOR OF CONTAINERS HAVING THE SAME OR DIFFERENT SHAPE AND SIZE

FIELD OF THE INVENTION

This invention relates to distributors for the deposit of melted solid products in the interior of containers, the containers being placed under the distributor.

BACKGROUND OF THE PRIOR ART

One of the operations carried out industrially is the deposit of products which exit from the production line within containers where they are collected, the containers being of every type or being intended for particular uses. Specifically, when one operates with a continuous cycle, it is necessary to provide an installation which allows to collect individual pieces which continuously exit from the operating machine and to provide for the deposit of the same pieces within containers for the collection, and after the containers are filled up they are removed and substituted with other empty containers.

The present state of the art is that apparatuses and installations for the transport are provided which have rendered the entire operation automatic, but they are constructively very complex, require a great deal of space and are of high cost. In particular, in the field of presswork operation operating with injection or by blowing of the plastic materials, the present state of the art for the best filling up of the containers requires that the containers be capable of moving with respect to the opening of the unloading of the material to be deposited, the opening remaining fixed so that the containers stop one at a time corresponding to the same opening up to the point when they are filled.

This type of deposit has serious drawbacks. The first drawback is due to the fact that it is necessary to construct mechanisms which are frequently complex in order to achieve the motion of the containers.

The second drawback is due to the necessity of constructing a structure which is sufficiently strong in order to carry out the mechanism of motion and the individual containers which may be empty and filled.

A third drawback is due to the fact that the advance of the containers of the type step-by-step which involves each item to be handled each time, all the containers must have the same size so that if the dimension of the container is changed it is necessary to modify the installation which regulates the motion of the containers.

A further drawback is due to the fact that the containers being moved along a movable plane are made with a rigid structure generally of a plastic material, usually called "casse" cases, which subsequently must be emptied in order to fill out the boxes usually made of paperboard in which the products are packed and shipped to clients.

SUMMARY OF THE PRESENT INVENTION

An object of the present invention is to provide an installation according to which the deposit of the melted products from the unloading opening within the containers in which they are collected is carried out constructively simply and which allows to fill out the containers in a regular and uniform manner; the containers having dimensions, volumes and weights which are different without modifying the structure of the apparatus.

A further object of the invention is to use, instead of rigid containers, directly the boxes made of paperboard which are used for packing the products so that after the boxes are filled it is sufficient to close them and they are ready for shipment, a fact which is very advantageous from an economical point of view.

These objects are achieved with an installation in which advantageously both the unloading opening and also the boxes in which the products are to be collected are still and there is used a device capable of collecting continuously the products being unloaded from the same opening to be deposited, always continuously, in the interior of the same boxes, depositing the product in a regular fashion along the entire surface occupied by the boxes made of plastic material, the so-called "casse" cases, which subsequently must be emptied to fill the boxes, generally made of paperboard, with which the products are packed and shipped to clients.

According to the invention an installation is provided in which the deposit of the melted products from the unloading opening within the container in which they are collected is provided in a constructively simple manner and which allows to fill in a regular and uniform manner the containers which have different dimensions, volumes and weights, without modifying the structure of the machine.

A further object of the invention resides in the use of, instead of rigid containers, directly the boxes made of paperboard used for packing the products so that after the boxes are filled, it is sufficient to close them and they are ready for shipment with a great deal of advantage from an economical point of view.

All these objects are achieved with an installation in which advantageously both the unloading opening as well as the boxes in which the products are to be collected are still and a device is provided capable of collecting continuously the products being unloaded from the same opening to be deposited, always continuously, in the interior of the same boxes, distributing the products in a regular fashion along the entire surface occupied by the same boxes, the boxes being placed under the same device, the boxes eventually being positioned above a pallet which facilitates the transportation.

This device which constitutes an essential feature of the present invention, is substantially composed of a carrier which is placed between the unloading opening of the melted products and the boxes in which the products are collected and which are placed under the unloading opening. This carrier is constituted essentially of a carriage capable of being displaced on a horizontal plane according to the two perpendicular directions in such a manner as to engage and to cover with its motion the entire area occupied by the boxes which are placed under the carriage and which are disposed in a manner which can be casual or they may be aligned and/or may be placed side by side one to the other in a predetermined manner.

Another essential feature of the invention is to provide a conveyor belt placed on the movable carriage of the type preferably having a close ring with parallel axes capable of advance motion in two opposite directions so that the products which are placed on the conveyor belt may fall alternatively from one side or the opposite side. In such a manner, as it is easily understandable, when one places the unloading opening of the product in the center of the area under it in which are present the boxes, the course of the carriage is cut in one-half because varying the direction of advance of the conveyor belt, the pieces will fall within the boxes which are disposed respectively on the right and on the left of the same opening.

The above described features and other essential features of the invention will be even more clear by reference to the description of a possible not limiting embodiment of the invention provided herein by way of illustration by reference to the accompanying drawings of which FIG. 1 is a front elevational view of the distributor of the invention;

FIG. 2 is a top plan view of the distributor of FIG. 1;

FIG. 3 is a side view of the distributor of FIG. 1.

As shown in the figures, the distributor (1) of the invention is placed under the conduit or unloading opening (2) of the products to be deposited and in position above the boxes (3) in which the products are being collected, the boxes being placed on pallets (4).

The distributor (1) is composed of carriage (5) which is provided with a conveyor belt (6). The conveyor belt is located under the unloading opening (2) to receive the melted products to be deposited in the boxes (3) which are placed under the unloading opening (2).

The carriage (5) is capable of moving on a horizontal plane sliding along longitudinal guides (7) and along transversal guides (8) which are applied on the supporting frame (9).

The conveyor belt (6) which is of the planar type and close ring is capable of running in the two opposite directions in such a manner that the products deposited on it are brought on one side or the opposite side and by means of conveying slides (10) fall within the boxes (3) which are located under the conveyor belt.

In actual operation after the worker has positioned the pallets with the empty boxes (3), an automized program of the type PLC provides to command the functioning of motors (11) and (12) respectively for the longitudinal displacement and for the transversal displacement of carriage (5) and the functioning of motor (13) for the advance in one direction or in the opposite direction of the conveyor belt (6) in such a manner that due to the combination of these motions the melted pieces fall in each one of the boxes which are placed under in a predetermined number and quantity.

Finally there is provided that the frame (9) be supplied with wheels and with telescopic legs to be capable of adapting itself to the several dispositions of the unloading opening and the several dimensions of the boxes in which the goods are collected.

On the basis of the foregoing description, the advantages of the distributor according to the present invention are clear because the distributor which is obtained with a simple construction and automatically allows to fill directly the boxes in which the goods are packed which may have different shape and size in a continuous manner and allows to deposit in the boxes different quantities of the pieces, all these operations being carried out continuously without interruption of the working cycle.

What is claimed is:

1. A distributor (1) for the deposit of melted products in the interior of containers of the same or different shape and size for use in operations having a continuous cycle and in presswork operating with injection or with blowing of plastic material, the distributor being placed under an unloading opening (2) for unloading the products to be deposited, wherein said unloading opening and said containers (3) are static and the distributor is placed above the containers in which the products are collected, said containers are boxes (3) of the same or different shape, said distributor (1) also comprising a movable carriage (5), said carriage being provided With conveyor belt (6), said conveyor belt (6) being located under said opening (2), said conveyor belt being located above said movable carriage (5), said boxes (3) being located under said carriage (5), said conveyor belt (6) being capable of a motion of advance in two opposite directions whereby the products deposited over said conveyor belt fall alternatively on one side or on the opposite side and fill said boxes (3) which are placed respectively on one side or the opposite side with respect to the position of said unloading opening (2).

2. The distributor according to claim 1 which comprises a support frame (9), longitudinal guides (7) and transversal guide (8), said carriage (5) is capable of motion on a horizontal plane sliding along said longitudinal guides (7) and said transversal guides (8), said guides being applied on said support frame (9).

3. The distributor according to claim 1 which comprises conveying slides (10) and wherein said conveyor belt (6) is planar having a closed ring and is provided with said conveying slides (10) to cause said products to fall exactly corresponding to said boxes (3) located under said conveying belt.

4. The distributor according to claim 1 which comprises an automized program of the PLC type, said program providing to command the functioning of two motors (11) and (12), said motors respectively providing for longitudinal displacement and transversal displacement of said carriage (5) and for the functioning of motor (13), said motor (13) providing for the advance in a direction or in the opposite direction of said conveyor belt (6) whereby as a result of the contemporaneous combination of said motions, said melted pieces fall in each one of said boxes (3) placed under said conveyor belt in the predetermined number and quantity.

5. The distributor according to claim 1 which comprises frame (9), said frame being provided with wheels and telescopic legs whereby said frame adapts itself to the different locations of the unloading opening (2) and the different dimensions of said boxes in which products are collected.

6. The distributor according to claim 1 which comprises pallets wherein said boxes (3) are made of paperboard or other types of containers directly used for packing, said boxes being disposed on said pallets (4) in such a manner that after the boxes are filled it is sufficient to close them and said boxes are ready for shipping.

* * * * *